(12) United States Patent
Holmbacka et al.

(10) Patent No.: US 12,355,252 B2
(45) Date of Patent: Jul. 8, 2025

(54) MANAGEMENT OF A DISTRIBUTED BATTERY ARRANGEMENT

(71) Applicant: Elisa Oyj, Helsinki (FI)

(72) Inventors: Simon Holmbacka, Helsinki (FI); Esko Heinonen, Helsinki (FI); Jukka-Pekka Salmenkaita, Helsinki (FI)

(73) Assignee: ELISA OYJ, Helsinki (FI)

( * ) Notice: Subject to any disclaimer, the term of this patent is extended or adjusted under 35 U.S.C. 154(b) by 0 days.

(21) Appl. No.: 18/713,671

(22) PCT Filed: Dec. 12, 2022

(86) PCT No.: PCT/FI2022/050823
§ 371 (c)(1),
(2) Date: May 27, 2024

(87) PCT Pub. No.: WO2023/111394
PCT Pub. Date: Jun. 22, 2023

(65) Prior Publication Data
US 2025/0023352 A1    Jan. 16, 2025

(30) Foreign Application Priority Data
Dec. 14, 2021   (FI) ..................... 20216273

(51) Int. Cl.
*H02J 3/28* (2006.01)
*H02J 3/24* (2006.01)
*H02J 7/00* (2006.01)

(52) U.S. Cl.
CPC ............... *H02J 3/28* (2013.01); *H02J 3/241* (2020.01); *H02J 7/0025* (2020.01); *H02J 7/0048* (2020.01); *H02J 7/00712* (2020.01)

(58) Field of Classification Search
CPC .. H02J 3/28; H02J 3/241; H02J 7/0048; H02J 7/00712; H02J 7/0025; H02J 3/32; H02J 3/38; H02J 7/0014; H02J 7/34
See application file for complete search history.

(56) References Cited

U.S. PATENT DOCUMENTS

| 9,373,960 B2 | 6/2016 | Pande et al. |
| 9,722,443 B2 | 8/2017 | Ishida et al. |

(Continued)

FOREIGN PATENT DOCUMENTS

WO    2012145563    10/2012

OTHER PUBLICATIONS

He, Guannan et al.: Optimal bidding strategy of battery storage in power markets considering performance based regulation and battery cycle life. Published in: IEEE Transactions on Smart Grid, 2016. Link to article, DOI: 10.1109/TSG.2015.2424314.

(Continued)

*Primary Examiner* — Carlos Amaya
(74) *Attorney, Agent, or Firm* — Espatent Oy

(57) ABSTRACT

A computer implemented method for managing a distributed battery arrangement, wherein the arrangement comprises a pool of battery assets (121-125), wherein the battery assets of the pool are individually owned. The method is performed by obtaining real time data relating to current state of the battery assets of the pool, wherein the current state of the battery assets of the pool comprises at least information about capacity and wear profile of the battery assets of the pool; and selecting one or more battery assets from the pool based on the obtained real time data to fulfil a capacity requirement for frequency balancing of electric grid (151).

20 Claims, 3 Drawing Sheets

(56) References Cited

U.S. PATENT DOCUMENTS

| | | | |
|---|---|---|---|
| 9,960,637 | B2 | 5/2018 | Sanders et al. |
| 11,014,466 | B2 | 5/2021 | Sinha et al. |
| 2012/0249048 | A1 | 10/2012 | Nishibayashi et al. |
| 2013/0249289 | A1 | 9/2013 | Patel et al. |
| 2014/0042978 | A1 | 2/2014 | Nishibayashi et al. |
| 2016/0211668 | A1 | 7/2016 | Becker et al. |
| 2016/0218511 | A1 | 7/2016 | Li et al. |
| 2016/0322835 | A1 | 11/2016 | Carlson et al. |
| 2019/0020196 | A1* | 1/2019 | Poon .................. H04L 67/1097 |
| 2019/0041886 | A1 | 2/2019 | Hakim et al. |
| 2019/0056451 | A1 | 2/2019 | Asghari et al. |
| 2019/0135578 | A1 | 5/2019 | Perunka et al. |
| 2019/0206000 | A1 | 7/2019 | ElBsat et al. |
| 2019/0273382 | A1 | 9/2019 | Zhang |
| 2019/0359065 | A1 | 11/2019 | Al-Awami et al. |
| 2020/0231056 | A1 | 7/2020 | Sadano et al. |
| 2020/0313439 | A1 | 10/2020 | Kakuda |
| 2021/0221247 | A1 | 7/2021 | Daniel et al. |
| 2021/0328432 | A1 | 10/2021 | Boulineau |

OTHER PUBLICATIONS

He, Guannan et al.: Power System Dispatch with Marginal Degradation Cost of Battery Storage. Jun. 9, 2020. http://arxiv.org/abs/1904.07771v3.

Preger, Yuliya et al.: Degradation of Commercial Lithium-Ion Cells as a Function of Chemistry and Cycling Conditions. 2020 Journal of The Electrochemical Society 167 120532.

Xu, Bolun et al.: Factoring the Cycle Aging Cost of Batteries Participating in Electricity Markets. Jul. 26, 2017. http://arxiv.org/abs/1707.04567v2.

Xu, Bolun et al.: Modeling of Lithium-Ion Battery Degradation for Cell Life Assessment. Article in: IEEE Transactions on Smart Grid • Jun. 2016. DOI: 10.1109/TSG.2016.2578950.

Parhizi, S. et al.: State of the art in research on microgrids: a review. IEEE Access. vol. 3, 2015 pp. 890-925. Digital Object Identifier 10.1109/ACCESS.2015.2443119.

* cited by examiner

302. Obtain real time data related to current state of battery assets

303. Select battery assets to fulfil a capacity requirement

Fig. 3A

302. Obtain real time data related to current state of battery assets

313. Select battery assets to fulfil a predefined capacity requirement

304. Dynamically update the selection of battery assets

305. Detect a need for frequency balancing

306. Activate currently selected battery assets

Fig. 3B

301. Balancing request defining a capacity requirement

302. Obtain real time data related to current state of battery assets

323. Select battery assets to fulfil the capacity requirement

306. Activate currently selected battery assets

324. Dynamically update the selection of battery assets

Fig. 3C

MANAGEMENT OF A DISTRIBUTED BATTERY ARRANGEMENT

TECHNICAL FIELD

The present disclosure generally relates to management of distributed battery arrangements. The disclosure relates particularly, though not exclusively, to management of individually owned distributed battery assets.

BACKGROUND

This section illustrates useful background information without admission of any technique described herein representative of the state of the art.

It is increasingly common that households or small and medium sized companies or other smaller scaler operators maintain battery systems for example for emergency energy backup purposes. In addition to providing backup energy source, the battery systems may be used for further optimization purposes, such as energy staggering and monetary savings by charging on cheap hours and discharging on more expensive hours.

Participation in frequency balancing of electric grid is however challenging for parties that have relatively small battery systems, since there may be a large capacity requirement. E.g. minimum of 1 MW may be required to participate in frequency balancing of electric grid.

Distributed energy system, DES, is a distributed battery arrangement for pooling together smaller scale energy storage assets to build a larger combined capacity. The system is centrally coordinated so that the battery assets of the DES may participate e.g. in frequency balancing of electric grid or other optimization tasks.

Now, there are provided some new considerations concerning distributed battery arrangements.

SUMMARY

The appended claims define the scope of protection. Any examples and technical descriptions of apparatuses, products and/or methods in the description and/or drawings not covered by the claims are presented not as embodiments of the invention but as background art or examples useful for understanding the invention.

According to a first example aspect there is provided a computer implemented method for managing a distributed battery arrangement, wherein the arrangement comprises a pool of battery assets, wherein the battery assets of the pool are individually owned. The method comprises
  obtaining real time data relating to current state of the battery assets of the pool, wherein the current state of the battery assets of the pool comprises at least information about capacity and wear profile of the battery assets of the pool; and
  selecting one or more battery assets from the pool based on the obtained real time data to fulfil a capacity requirement for frequency balancing of electric grid.

In some embodiments, the capacity requirement is a predefined value; and wherein the selected battery assets are activated responsive to detecting a need for frequency balancing of electric grid.

In some embodiments, the capacity requirement is a capacity requirement of Frequency Containment Reserve, FCR.

In some embodiments, the capacity requirement is defined in a balancing request; and wherein the selection of one or more battery assets is performed responsive to receiving the balancing request, the method further comprising activating the selected battery assets in connection with the selection.

In some embodiments, the balancing request is a balancing request of automatic Frequency Restoration Reserve, aFRR.

In some embodiments, the method further comprises dynamically updating the selection of the one or more battery assets based on changes in the real time data and/or the capacity requirement.

In some embodiments, selecting the one or more battery assets from the pool is further based on one or more of: type of the battery assets, whether the battery assets are located indoors or outdoors, temperature of the operating environment of the battery assets, geographical location of the battery assets, reliability of the battery assets, priority order of the battery assets.

In some embodiments, selecting the one or more battery assets from the pool is performed by sequentially selecting battery assets until the capacity requirement is fulfilled.

In some embodiments, selecting the one or more battery assets from the pool comprises arranging battery assets of the pool in one or more priority queues, wherein the method further comprises activating the selected battery assets in priority order defined by the priority queues.

In some embodiments, the priority queues are based on minimizing battery wear of the battery assets, based on capacity limits of the battery assets, based on accumulated active usage of the battery asset, or based on a combination of two or more of these.

In some embodiments, the sequential selection is performed by first selecting a first battery asset with lowest wear and sequentially continuing to next battery asset with next lowest wear.

In some embodiments, the sequential selection is performed so that combination of largest batteries and lowest battery wear is selected.

In some embodiments, selecting the one or more battery assets from the pool is performed by selecting only battery assets located in a predefined geographical area.

In some embodiments, the capacity requirement concerns up regulation and/or down regulation.

In some embodiments, the battery assets have predefined capacity limits defining usable capacity range, and wherein the capacity limits are taken into account in the current state of the battery assets.

In some embodiments, the capacity limits comprise a first capacity limit and a second capacity limit, wherein the first capacity limit defines minimum charge that is to be maintained in the battery asset and the second capacity limit defines maximum charge; wherein capacity falling between the first capacity limit and the second capacity limit is the usable capacity range.

In some embodiments, at least part of the usable capacity range is assigned for up regulation and wherein capacity above the second capacity limit is assigned for down regulation.

According to a second example aspect of the present invention, there is provided an apparatus comprising a processor and a memory including computer program code; the memory and the computer program code configured to, with the processor, cause the apparatus to perform the method of the first aspect or any related embodiment.

According to a third example aspect of the present invention, there is provided a computer program comprising computer executable program code which when executed by a processor causes an apparatus to perform the method of the first aspect or any related embodiment.

According to a fourth example aspect there is provided a computer program product comprising a non-transitory computer readable medium having the computer program of the third example aspect stored thereon.

According to a fifth example aspect there is provided an apparatus comprising means for performing the method of any preceding aspect.

Any foregoing memory medium may comprise a digital data storage such as a data disc or diskette; optical storage; magnetic storage; holographic storage; opto-magnetic storage; phase-change memory; resistive random-access memory; magnetic random-access memory; solid-electrolyte memory; ferroelectric random-access memory; organic memory; or polymer memory. The memory medium may be formed into a device without other substantial functions than storing memory or it may be formed as part of a device with other functions, including but not limited to a memory of a computer; a chip set; and a sub assembly of an electronic device.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which:

FIG. 3A-3C show flow charts according to example embodiments;

DETAILED DESCRIPTION

Figure 1:
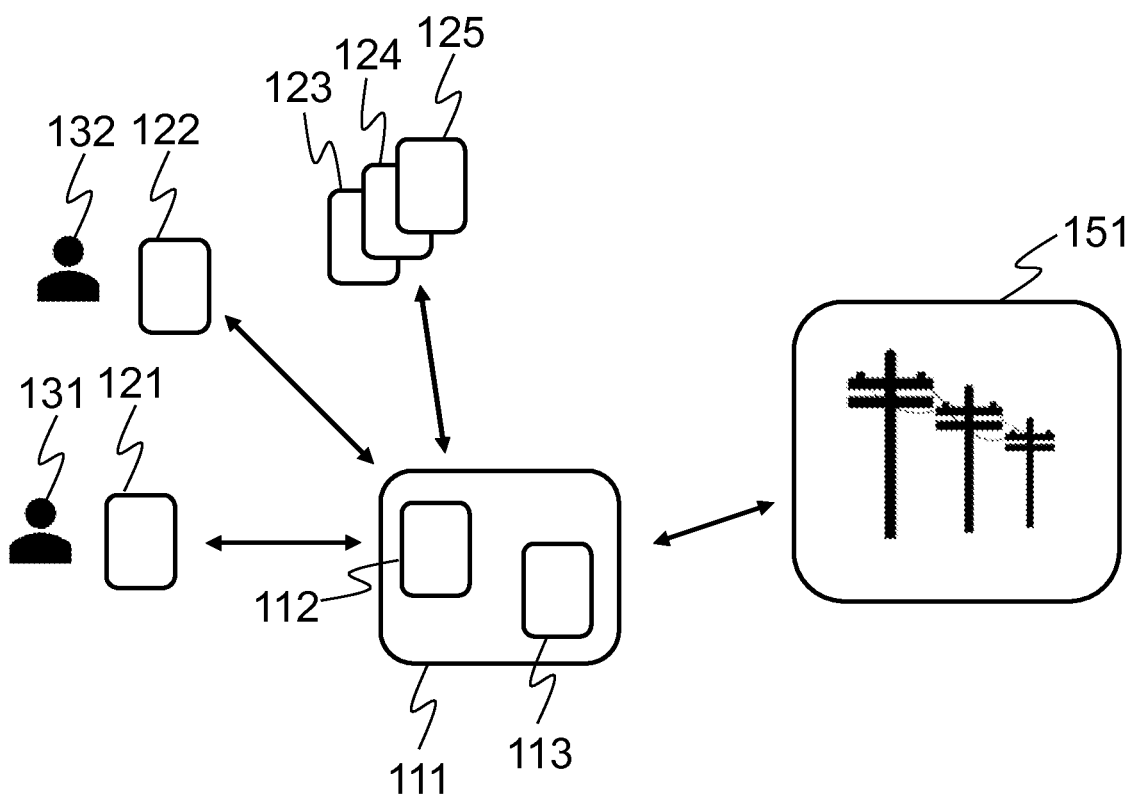
FIG. 1 schematically shows a system according to an example embodiment.

In the following description, like reference signs denote like elements or steps.

Various embodiments of present disclosure provide mechanisms to manage a distributed battery arrangement that comprises a pool of battery assets (i.e. a plurality of battery assets). The managed assets may be individually owned resources of households or small and medium sized companies or other smaller scaler operators. The managed battery assets may be intended for emergency backup purposes, but this is not mandatory. As an alternative non-limiting example, the managed battery assets may be intended for storing energy from renewable sources such as solar panels and/or wind generators or even from fuel cell or other type of fuel-operated genset. Yet another additional or alternative intended use of the managed battery assets is optimization of self-consumption. The battery asset may be a hybrid system using multiple energy sources.

In general, more than one battery asset of the pool may be owned by the same entity, but nevertheless there are multiple different battery asset owners in the pool.

In general, the battery assets in this disclosure refer to battery assets that are able to handle regular charge and discharge cycles. For example, lithium-ion batteries are such battery assets. In more detail, one or more of the following battery technologies may be represented in the pool of battery assets: lithium-nickel-cobalt, NCA, lithium-iron-phosphate, LFP, lithium-nickel-manganese-cobalt, NMC, and solid-state batteries. The battery assets may have different properties with regard to price, durability, physical size and wear depending for example on the battery technology and storage capacity.

In general, lithium-ion batteries should not regularly exceed extreme low or high charge values. For example, state of charge below 5% or above 95% should be avoided. Such limitations should be taken into account in usage of the lithium-ion batteries to avoid increased wear of the batteries.

One aim is to achieve that asset holders (owners of the battery assets of the pool) have an incentive to participate in frequency balancing of electric grid as much as possible. In this way grid balancing is improved whereby more stable energy source may be achieved without additional environmental burden.

Frequency balancing of electric grid may be arranged for example using automatic Frequency Restoration Reserve, aFRR, or Frequency Containment Reserve, FCR, capacity market. Various embodiments of present disclosure provide a centralized coordinator for managing a distributed battery arrangement so that the battery asset owners are able to participate in frequency balancing of electric grid e.g. in the aFRR and/or FCR capacity market.

aFRR is a centralized automatically activated reserve. Its activation is based on a power change signal calculated on the base of the frequency deviation in the Nordic synchronized area. Its purpose is to return the frequency to the nominal value.

FCR is an active power reserve that is automatically controlled based on the frequency deviation. FCR may be Frequency Containment Reserve for Normal Operation, FCR-N, or Frequency Containment Reserve for Disturbances, FCR-D. Their purpose is to contain the frequency during normal operation and disturbances.

The frequency balancing may comprise up regulation and/or down regulation. Up regulation means increasing power production or decreasing consumption. Down regulation means decreasing power production or increasing consumption.

FIG. 1 schematically shows an example scenario according to an embodiment. The scenario shows a pool of battery assets 121-125. The battery assets 121-125 may be located at different geographical locations, but equally there may be plurality of battery assets at the same location. FIG. 1 shows the battery assets 123-125 at the same location and the battery assets 121 and 122 individually at different locations. The battery assets 121 and 122 are owned by individuals 131 and 132, respectively. The battery assets 123-125 are co-located battery assets owned for example by a small company. It is to be noted that this is only a non-limiting illustrative example and in practical implementations many different setups are possible.

Further, the scenario shows a coordinator system 111. Still further, FIG. 1 shows an electric grid 151.

The coordinator system 111 is configured to implement at least some example embodiments of present disclosure to manage the battery assets 121-125. For this purpose, the coordinator system 111 is operable to interact with the battery assets 121-125 or equipment associated thereto. The coordinator system 111 comprises a first interface 112 for such interaction. The first interface may further allow owners of the battery assets 121-125 to interact with the coordinator system 111 for example to adjust settings of their battery assets. Additionally, the coordinator system 111 is operable to interact with the electric grid 151 or equipment associated thereto to coordinate participation in frequency balancing of the electric grid. The coordinator system 111 comprises a second interface 113 for this purpose.

The coordinator system may receive compensation based on the frequency balancing carried out for the electric grid. The compensation may depend on actual activation of frequency balancing and/or on reserving capacity for the possible frequency balancing needs. The coordinator system 111 may be configured to respectively compensate the battery assets (or the owners of the battery assets).

Figure 2:
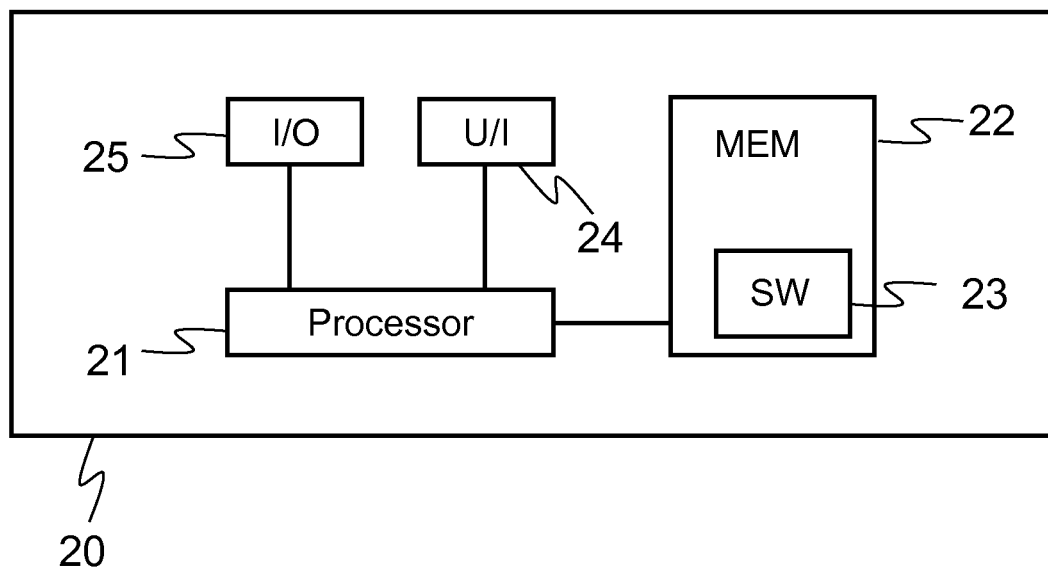
FIG. 2 shows a block diagram of an apparatus according to an example embodiment.

FIG. 2 shows a block diagram of an apparatus 20 according to an embodiment. The apparatus 20 is for example a general purpose computer, cloud computing environment or some other electronic data processing apparatus. The apparatus 20 can be used for implementing at least some embodiments of the invention. That is, with suitable configuration the apparatus 20 is suited for operating for example as the coordinator system 111 of FIG. 1.

The apparatus 20 comprises a communication interface 25; a processor 21; a user interface 24; and a memory 22. The apparatus 20 further comprises software 23 stored in the memory 22 and operable to be loaded into and executed in the processor 21. The software 23 may comprise one or more software modules and can be in the form of a computer program product.

The processor 21 may comprise a central processing unit (CPU), a microprocessor, a digital signal processor (DSP), a graphics processing unit, or the like. FIG. 2 shows one processor 21, but the apparatus 20 may comprise a plurality of processors.

The user interface 24 is configured for providing interaction with a user of the apparatus. Additionally or alternatively, the user interaction may be implemented through the communication interface 25. The user interface 24 may comprise a circuitry for receiving input from a user of the apparatus 20, e.g., via a keyboard, graphical user interface shown on the display of the apparatus 20, speech recognition circuitry, or an accessory device, such as a headset, and for providing output to the user via, e.g., a graphical user interface or a loudspeaker.

The memory 22 may comprise for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 20 may comprise a plurality of memories. The memory 22 may serve the sole purpose of storing data, or be constructed as a part of an apparatus 20 serving other purposes, such as processing data.

The communication interface 25 may comprise communication modules that implement data transmission to and from the apparatus 20. The communication modules may comprise a wireless or a wired interface module(s) or both. The wireless interface may comprise such as a WLAN, Bluetooth, infrared (IR), radio frequency identification (RFID), GSM/GPRS, CDMA, WCDMA, LTE (Long Term Evolution) or 5G radio module. The wired interface may comprise such as Ethernet or universal serial bus (USB), for example. The communication interface 25 may support one or more different communication technologies. The apparatus 20 may additionally or alternatively comprise more than one of the communication interfaces 25.

A skilled person appreciates that in addition to the elements shown in FIG. 2, the apparatus 20 may comprise other elements, such as displays, as well as additional circuitry such as memory chips, application-specific integrated circuits (ASIC), other processing circuitry for specific purposes and the like.

FIGS. 3A-3C and 5 show flow charts according to example embodiments. FIGS. 3A-3C and 5 illustrate processes comprising various possible steps including some optional steps while also further steps can be included and/or some of the steps can be performed more than once. The processes may be implemented in the coordinating system 111 of FIG. 1 and/or in the apparatus 20 of FIG. 2. The processes are implemented in a computer program code and does not require human interaction unless otherwise expressly stated. It is to be noted that the processes may however provide output that may be further processed by humans and/or the processes may require user input to start.

FIG. 3A-3C provide management of a pool of battery assets, such as e.g. the battery assets 121-125 of FIG. 1, for the purpose of frequency balancing an electrical grid. The process of 3A comprises the following steps:

302: Real time data relating to current state of the battery assets of the pool is obtained. The current state of the battery assets of the pool comprises at least information about capacity and wear profile of the battery assets of the pool. However, also further information may be obtained for example relating to type of the battery assets, whether the battery assets are located indoors or outdoors, temperature of the operating environment of the battery assets, geographical location of the battery assets, reliability of the battery assets, priority order of the battery assets. Such further information may be real time data or the information may be static information pre-stored into a database or the like.

In the context of this disclosure, the real time data is to be understood in relation to speed of change of that specific data. Real time may be considered as referring to currently valid data. For some relatively slowly changing data "real time" can be update frequency of minutes (or more), for faster changing data seconds or even less (in extreme cases). If the data does not change every minute, there is no need to update the data in terms of seconds to always have accurate real time data.

303: One or more battery assets are selected from the pool to fulfil a capacity requirement defined for frequency balancing of electric grid. The selection is performed based on the obtained real time data. The selected battery assets may be activated for fulfilling the capacity requirement at the same time with the selection.

The capacity requirement may be a predefined value, such as a capacity requirement of FCR. In such case, the selection of battery assets is in general performed beforehand and the preselected battery assets are activated when frequency balancing need is detected. Such example is discussed in more detail in connection with FIG. 3B.

The capacity requirement may be defined in a balancing request, such as a balancing request of aFRR. In such case, the exact capacity requirement is not necessarily known before frequency balancing is needed. Thereby, the selection and activation of battery assets are performed concurrently in response to balancing request or in response to detecting balancing need. Such example is discussed in more detail in connection with FIG. 3C.

The process of 3B comprises the following steps:

302: Real time data relating to current state of the battery assets of the pool is obtained the same way as in FIG. 3A.

313: One or more battery assets are selected from the pool to fulfil a predefined capacity requirement. The capacity requirement is for example a capacity requirement of FCR. The selection is performed based on the obtained real time data.

This step is in general performed prior to needing activation of battery assets, i.e. prior to detecting a need to balance electric grid.

304: Optionally, the selection of battery assets is updated. This is performed by repeating steps 302 and 313, i.e. by updating the real time data and performing reselection of battery assets if there are changes in the selection criteria.

The updating process may be periodic. The update frequency may depend on the properties of the battery assets. The update frequency may depend for example on assumed speed of change in state of battery assets.

By the update process, one achieves that the selection of the battery assets adapts to changes in the state of battery assets.

305: Need for frequency balancing of electric grid is detected. The need for frequency balancing may be based on detecting deviation in frequency of the grid or based on an activation signal from the electric grid operator.

306: Responsive to detecting the need for frequency balancing, the currently selected battery assets are activated.

The need for frequency balancing may be detected by a process running in equipment associated with each selected battery asset. In such case also the activation is performed by the same process. Alternatively, the need for frequency balancing may be detected by a coordinating entity such as the coordinator system 111 of FIG. 1. In such case also the activation is performed by the coordinating entity.

The process of 3C comprises the following steps:

301: Need for frequency balancing of electric grid is detected based on a balancing request or an activation signal that defines a capacity requirement. The balancing request is for example a balancing request of aFRR.

302: Responsive to the frequency balancing need, real time data relating to current state of the battery assets of the pool is obtained the same way as in FIG. 3A.

323: One or more battery assets are selected from the pool to fulfil the capacity requirement defined in the balancing request. The selection is performed based on the obtained real time data.

306: The currently selected battery assets are activated the same way as in FIG. 3B.

324: Optionally, the selection of battery assets is updated. This is performed responsive to receiving next balancing request and by repeating the method starting from step 301. In this way the selection of battery assets is always adapted to current state of the battery assets and current capacity requirement.

In an embodiment, the selection of battery assets in steps 303, 313 and/or 323 is performed sequentially (i.e. selecting battery assets one after another) until the respective capacity requirement is fulfilled.

In a further embodiment, the sequential selection is performed by first selecting a first battery asset with lowest wear and sequentially continuing to next battery asset with next lowest wear. The real time data relating to current state of the battery assets may include readily usable parameter indicating current wear state, or current battery wear state may estimated by the coordinating entity based on the real time data. More detailed examples of battery wear are discussed later in this document.

In yet another embodiment, the sequential selection is performed so that combination of largest batteries and lowest battery wear is selected.

Additionally or alternatively, only assets located in a predefined geographical area may be selected.

In an embodiment, at least some of the further information discussed in step 302 may be updated based on selecting and using the battery assets. For example priority order may be updated so that the same battery assets is not continuously used, but instead all battery assets of the pool will be circulated. Additionally or alternatively, reliability of battery assets may be updated based on whether a selected battery asset operated reliably or not.

In an embodiment, one or more predefined priority queues may be used in the activation step 306 of FIGS. 3B and 3C. The priority queues may be defined beforehand or in connection with the selection steps 303, 313 and 323 of FIGS. 3A-3C. There may be different priority queues for up regulation and down regulation. Further, there may be different priority queues for different regulation types (aFRR and FCR, for example).

The battery assets are then selected and/or activated in the priority order, which may simplify the selection and activation steps.

In an embodiment, the predefined priority queues are based on minimizing battery wear of the battery assets. In another embodiment, the predefined priority queues are based on capacity limits of the battery assets. An example of capacity limits is discussed in connection with FIG. 4. For example, difference between current capacity of the battery assets and one or more capacity limits may be taken into account. In this way, largest available capacity may be prioritized, for example. In yet another embodiment, the predefined priority queues are based on accumulated active usage of the battery asset (e.g. number of effective full cycles) in a defined time period. In this way, usage of the battery assets may be evenly distributed, for example. Further, two or more of these prioritization principles may be combined.

The priority queues may be periodically updated to optimize operation of the arrangement. The following provides further details on wear of the batteries and evaluation of wear state of the battery assets.

Using batteries causes them to wear. A battery wear profile indicates current state of wear of the battery asset. In an embodiment, the battery wear profile is at least partly based on laboratory tests for different battery chemistries. Batteries wear when they are cycled, and the wear caused by one cycle depends heavily on the depth of discharge, DoD. However, also different battery chemistries react differently to DoD and total cycle count. Thus, using different battery chemistries results to different cycling costs.

Additionally or alternatively, temperature of the operating environment of the battery assets may be taken into account in the battery wear profile. For example, whether the battery is operated indoors in a temperate facility or outdoors with significant temperature fluctuation, may have significant effect on the battery wear. Batteries stored indoors usually experience less significant wear and thus better maintain capacity than batteries stored outdoors in cold temperatures (e.g. minus degrees Celsius).

For a new battery, the State of Health, SoH, is at maximum (at 100% for example), and there is no wear yet. For example linear model may be used for estimating the wear. In an example wear increases/SoH decreases relative to time/total cycle count.

Still further, artificial intelligence tools or machine learning tools may be used for estimating current state of wear based on information about usage of respective battery asset.

Battery Management System, BMS, or other equipment in connection with each battery assets of the pool may monitor wear of the respective battery asset. The BMS may update wear parameters to a suitable cloud service or directly to the coordinating entity or the coordinating entity may inquire the parameters from the BMS.

In an embodiment, wear profile of a battery asset is obtained from a suitable wear model. In an embodiment, there is a wear model that gives the wear profile of a battery asset as an output when operating condition parameters of that battery asset are input to the model. The wear model may be a predefined model or it may be dynamically trained based on operating behavior of battery assets.

Figure 4:
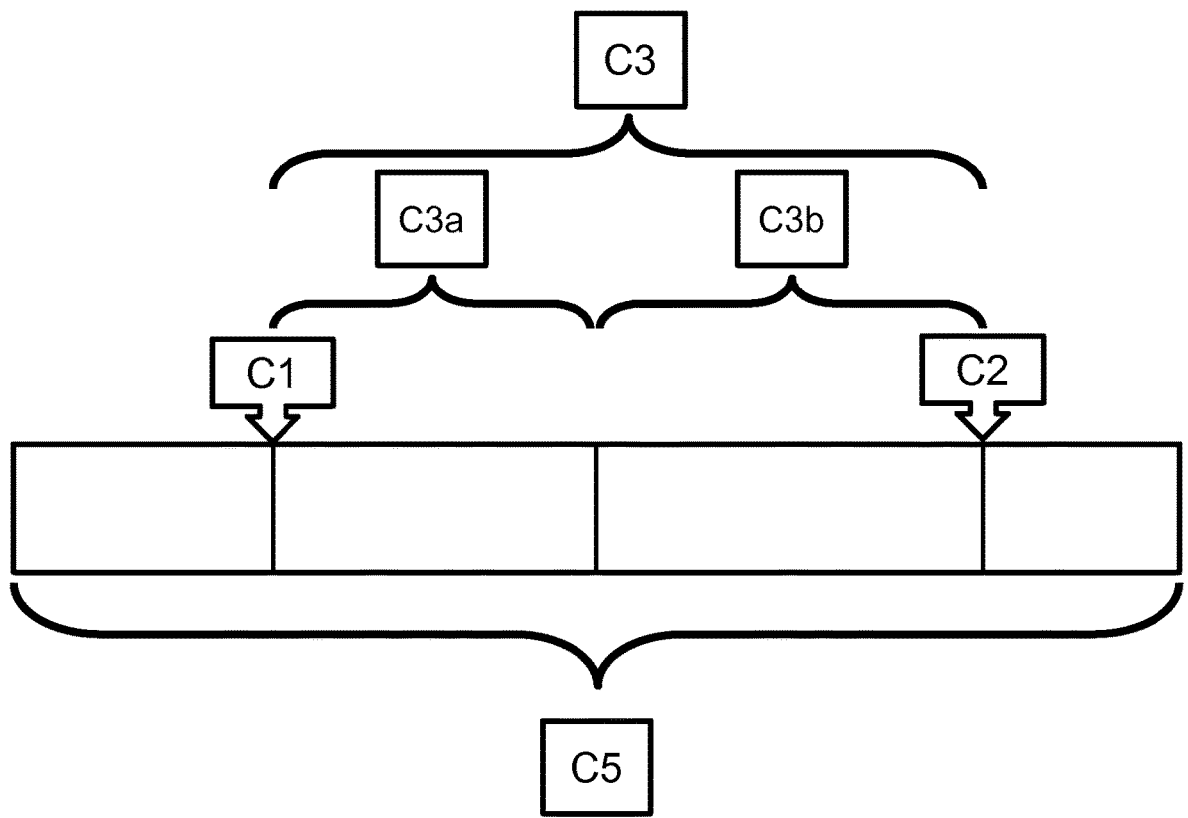
FIG. 4 illustrates an example of capacity limits of a battery asset.

In an embodiment, the battery assets have capacity limits defining capacity range that is usable by the coordinator system. FIG. 4 illustrates an example of capacity limits of a battery asset.

Full length of a bar shown in FIG. 4 illustrates full capacity C5 of the battery asset. This depends on the physical properties of the battery asset. Further, FIG. 3 shows a first capacity limit C1, a second capacity limit C2, and a usable capacity range C3 defined by the difference between C1 and C2.

The first capacity limit C1 defines a minimum charge that is to be maintained in the battery asset e.g. for backup purposes or for some other dedicated purpose. In an embodiment, this is a value that can be individually set by the owners of the battery assets. Alternatively, there may be a default value for the first capacity limit C1. The default may be defined for example as certain percentage of the full capacity C5.

The second capacity limit C2 defines maximum charge that should not be exceeded. This is the limit at which the battery is maximally charged, and which should not be regularly exceeded to not increase wear of the battery asset. In an embodiment, this is a value that can be individually set by the owners of the battery assets. Alternatively, there may be a default value for the second capacity limit C2. The default may be defined for example as certain percentage of the full capacity C5.

Further, there may be a fourth capacity limit (not shown) that defines minimum charge level below which the battery asset is not recommended to go in order to avoid increased wear. This capacity limit should be taken into account even in battery asset owner's own use of the battery.

In an example case, the first capacity limit is 30-50%, the second capacity limit is 80-90%, and the fourth capacity limit is 5-10%. But this is clearly only one non-limiting example.

The capacity limits may be set by the owners of the battery assets through the first interface 112 of the coordinator system 111 of FIG. 1. Alternatively the capacity limits may be set in battery asset equipment. In yet another alternative, the coordinating entity may set the capacity limits or at least default capacity limits that are initially applied. In yet another alternative, there may be some predefined setting alternatives and the battery asset owner may choose one of the provided alternatives. In an example, there is one predefined setting alternative for maximal asset longevity (minimal market participation), one for maximal market participation (at the cost of faster asset wear), and one for a balanced choice between those. I.e. the owners of battery assets may have ability to control the capacity limits at least to some extent, but this is not mandatory.

The optimization capacity C3 falling between the first capacity limit C1 and the second capacity limit C2 is centrally managed by the coordinator system for energy optimization purposes such as frequency balancing of electric grid and/or for charging optimization by discharging the C3 capacity during expensive or high load hours and charging during cheap or low load hours. Further, the charging optimization may involve charging during availability of renewable energy source in attempt to reduce use of non-renewable energy sources.

In an embodiment, the optimization capacity C3 may be further divided by the coordinator to smaller capacity chunks C3a and C3b. Alternatively, the optimization capacity C3 may be divided to even more than two smaller chunks. In an embodiment, the capacity C3a is assigned for aFRR or FCR up regulation and the capacity C3b is assigned for being used in charging optimization. Further, battery capacity above the second capacity limit C2 may be assigned for aFRR or FCR down regulation.

Figure 5:
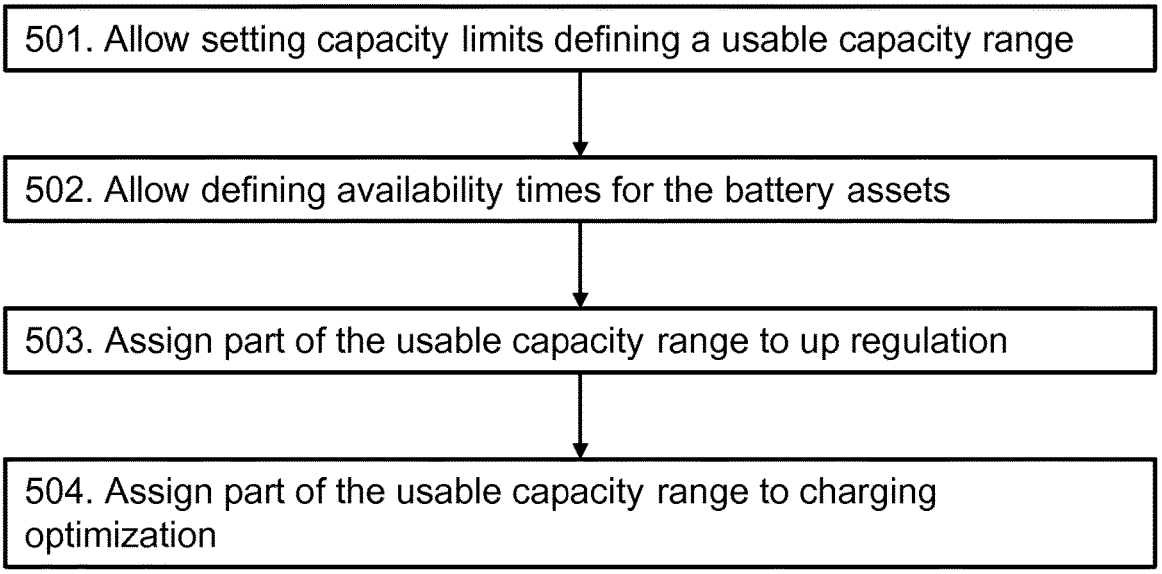
FIG. 5 shows a flow chart according to further example embodiments.

FIG. 5 provides further details on features of the coordinator system.

501: The coordinator system allows setting capacity limits that define a capacity range that is usable by the coordinator. The usable capacity range is for example the capacity range C3 of FIG. 4. That is, the owners of the battery assets may individually decide e.g. the first capacity limit and the second capacity limit of FIG. 4. In this way the asset owners have control over their battery asset and may ensure for example that certain capacity is always available for their own use, while at the same time benefitting from participation in frequency balancing of electric grid or other optimization actions by the coordinator.

The capacity limits may be set e.g. through the first interface 112 of FIG. 1 or in battery asset equipment.

502: The coordinator system may further allow setting availability times for the battery assets. The availability times may be set e.g. through the first interface 112 of FIG. 1.

In this way, battery asset owners may for example set their assets available during their absence (e.g. holiday) or for any period when they do not need the battery assets for their own purposes. Additionally or alternatively, the battery asset owners may set a time range during which the battery asset is allowed to deviate from the capacity limits. For example, the battery asset owner can allow 10% deviation from the first capacity limit C1 between 7:00 and 9:00 because much reserve capacity is often needed at that time period. After that the battery asset owner may for example charge the consumed energy back using solar energy as the sun rises.

The coordinator system may have ability to control the usable capacity range and to assign capacity for different purposes. In step 503, the coordinator assigns part of the usable capacity range to up regulation. In step 504, the coordinator assigns part of the usable capacity range to charging optimization. In this way the coordinator may ensure that there is always capacity available for different actions.

Without in any way limiting the scope, interpretation, or application of the appended claims, a technical effect of one or more of the example embodiments disclosed herein is improved coordination of a pool of battery assets to allow participation and/or to provide incentive to participate in frequency balancing of electric grid by smaller scale battery asset owners. By matching capacity requirement of the electric grid to real time battery properties and performing the matching in real time one may achieve more efficient use of distributed battery assets. This may improve overall reliability of electric grid.

Any of the afore described methods, method steps, or combinations thereof, may be controlled or performed using hardware; software; firmware; or any combination thereof. The software and/or hardware may be local; distributed; centralised; virtualised; or any combination thereof. Moreover, any form of computing, including computational intelligence, may be used for controlling or performing any of the afore described methods, method steps, or combinations thereof. Computational intelligence may refer to, for example, any of artificial intelligence; neural networks; fuzzy logics; machine learning; genetic algorithms; evolutionary computation; or any combination thereof.

Various embodiments have been presented. It should be appreciated that in this document, words comprise; include; and contain are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed example embodiments may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A computer implemented method for managing a distributed battery arrangement,
   wherein the arrangement comprises a pool of battery assets, wherein the battery assets of the pool are individually owned; the method comprising
   obtaining real time data relating to current state of the battery assets of the pool, wherein the current state of the battery assets of the pool comprises at least information about capacity and wear profile of the battery assets of the pool; and
   responsive to a balancing request defining a capacity requirement for frequency balancing of electric grid, selecting one or more battery assets from the pool based on the obtained real time data to fulfil the capacity requirement.

2. The method of claim 1, further comprising activating the selected battery assets in connection with the selection.

3. The method of claim 2, wherein the balancing request is a balancing request of automatic Frequency Restoration Reserve, aFRR.

4. The method of claim 1, further comprising dynamically updating the selection of the one or more battery assets based on changes in the real time data and/or the capacity requirement.

5. The method of claim 1, wherein selecting the one or more battery assets from the pool is further based on one or more of: type of the battery assets, whether the battery assets are located indoors or outdoors, temperature of the operating environment of the battery assets, geographical location of the battery assets, reliability of the battery assets, priority order of the battery assets.

6. The method of claim 1, wherein selecting the one or more battery assets from the pool is performed by sequentially selecting battery assets until the capacity requirement is fulfilled.

7. The method of claim 1, wherein selecting the one or more battery assets from the pool comprises arranging battery assets of the pool in one or more priority queues, wherein the method further comprises activating the selected battery assets in priority order defined by the priority queues.

8. The method of claim 6, wherein the priority queues are based on minimizing battery wear of the battery assets, based on capacity limits of the battery assets, based on accumulated active usage of the battery asset, or based on a combination of two or more of these.

9. The method of claim 6, wherein the sequential selection is performed by first selecting a first battery asset with lowest wear and sequentially continuing to next battery asset with next lowest wear.

10. The method of claim 6, wherein the sequential selection is performed so that combination of largest batteries and lowest battery wear is selected.

11. The method of claim 1, wherein selecting the one or more battery assets from the pool is performed by selecting only battery assets located in a predefined geographical area.

12. The method of claim 1, wherein the capacity requirement concerns up regulation and/or down regulation.

13. The method of claim 1, wherein the battery assets have predefined capacity limits (C1, C2) defining usable capacity range, and wherein the capacity limits are taken into account in the current state of the battery assets.

14. The method of claim 12, wherein the capacity limits comprise a first capacity limit (C1) and a second capacity limit (C2), wherein the first capacity limit (C1) defines minimum charge that is to be maintained in the battery asset and the second capacity limit (C2) defines maximum charge; wherein capacity falling between the first capacity limit (C1) and the second capacity limit (C2) is the usable capacity range (C3).

15. The method of claim 13, wherein at least part of the usable capacity range (C3) is assigned for up regulation and wherein capacity above the second capacity limit (C2) is assigned for down regulation.

16. An apparatus comprising:
   a memory section comprising computer executable program code; and
   a processing section configured to cause the apparatus to perform, when executing the program code, at least: the method of claim 1.

17. A non-transitory computer readable medium having stored there on computer executable program code which when executed in an apparatus causes the apparatus to perform the method of claim 1.

18. The method of claim 2, further comprising dynamically updating the selection of the one or more battery assets based on changes in the real time data and/or the capacity requirement.

19. The method of claim 3, further comprising dynamically updating the selection of the one or more battery assets based on changes in the real time data and/or the capacity requirement.

20. The method of claim 2, wherein selecting the one or more battery assets from the pool is further based on one or more of: type of the battery assets, whether the battery assets are located indoors or outdoors, temperature of the operating environment of the battery assets, geographical location of the battery assets, reliability of the battery assets, priority order of the battery assets.

\* \* \* \* \*